US00RE36552E

United States Patent [19]

Fannin et al.

[11] E Patent Number: Re. 36,552

[45] Reissued Date of Patent: Feb. 8, 2000

[54] APPARATUS AND METHOD FOR PRINTING MULTIPLE ACCOUNT LINES

[75] Inventors: Randall W. Fannin, Lawrenceville; Waldo F. Martin, Conyers, both of Ga.

[73] Assignee: John H. Harland Company, Atlanta, Ga.

[21] Appl. No.: 09/115,955

[22] Filed: Jul. 15, 1998

Related U.S. Patent Documents

Reissue of:

[64] Patent No.: 5,535,677
Issued: Jul. 16, 1996
Appl. No.: 08/263,562
Filed: Jun. 22, 1994

[51] Int. Cl.[7] ..... B41J 1/32

[52] U.S. Cl. ..... 101/486; 101/216; 101/248

[58] Field of Search ..... 101/180–181, 101/212, 216, 219, 247, 248, 483, 485, 486

[56] References Cited

U.S. PATENT DOCUMENTS

| | | | |
|---|---|---|---|
| 2,995,081 | 8/1961 | Crissy . | |
| 3,156,182 | 11/1964 | Ritzerfeld . | |
| 3,724,368 | 4/1973 | Treff | 101/248 |
| 3,746,957 | 7/1973 | Forster et al. | 101/248 |
| 3,863,566 | 2/1975 | Schirrich et al. | 101/248 |
| 4,207,815 | 6/1980 | Watanabe | 101/216 |
| 4,350,093 | 9/1982 | Ishii | 101/248 |
| 4,363,270 | 12/1982 | Ury et al. | 101/180 |
| 4,572,074 | 2/1986 | Guaraldi | 101/248 |
| 5,233,920 | 8/1993 | Shinmoto et al. | 101/248 |
| 5,327,826 | 7/1994 | Rodi | 101/486 |

*Primary Examiner*—Eugene Eickholt
*Attorney, Agent, or Firm*—Jones & Askew, LLP

[57] ABSTRACT

A printing method and apparatus for printing different indicia, such as account numbers, on selected documents without changing plates or stopping the press during a press run. Different indicia are provided at two or more lines on a printing plate, each line being separated from an adjacent line on the plate by a predetermined distance relative to movement of the plate in a press. The plate transfers images to a blanket having a region that does not contact the plate and thus receives no image of the plate area that registers with the noncontacting region of the blanket. The plate and blanket initially are aligned so that the noncontacting region registers with one set of indicia on the plate, so that the blanket receives a partial inked image lacking that indicia. That partial inked image is transferred to sheets passing through the press. A differential drive selectively displaces the angular position of the plate cylinder on the fly relative to the blanket cylinder, so that a different set of indicia becomes aligned with the noncontacting region on the blanket cylinder, whereby the blanket does not receive an inked image of that different set of indicia and following sheets are not printed with that indicia.

28 Claims, 4 Drawing Sheets

APPARATUS AND METHOD FOR PRINTING MULTIPLE ACCOUNT LINES

Matter enclosed in heavy brackets [ ] appears in the original patent but forms no part of this reissue specification; matter printed in italics indicates the additions made by reissue.

FIELD OF THE INVENTION

This invention relates in general to printing documents that are particularized with account numbers or the like, and relates in particular to printing account numbers onto checks and deposit tickets.

BACKGROUND OF THE INVENTION

Bank checks prepared for a particular account typically include the number of that account printed on each individual check. This account number usually appears on a single line located near the bottom of each check, for consistent identification of checks in a mechanized, check-clearing operation. The account line usually includes a unique number string identifying the individual account on which the checks are drawn, and also includes another portion identifying the particular bank or other financial institution with which the particular account is maintained. This account-line information appears on the individual deposit tickets for the account, in addition to the checks issued to the account holder. The account-line information is printed on the checks using a special type font known as E13B and is printed using magnetic ink. Together this is known as MICR printing and is both visually readable and machine readable for mechanized reading and sorting of checks and deposit tickets by the financial institutions. Individuals who open a new checking account will receive a limited supply of "starter" checks and deposit tickets containing a pre-assigned account number for use while a full supply of checks and deposit tickets is prepared for the new account. Checks usually are printed not by the bank or other financial institution maintaining the account, but by specialist printers who prepare checks for various financial institutions.

Some banks require different account numbers printed on the checks and deposit tickets associated with each account. The account number printed on the deposit tickets, for example, may be a subset of the account number printed on the checks for that account, or the account numbers may otherwise differ in some manner. Checks for individual account holders usually are printed in relatively small quantities, e.g., 100 or 200 checks per order, and primarily are printed on an offset press. With this well-known printing technique, a plate is prepared containing the account number for the particular account, together with the name and address of the account holder to be printed elsewhere on the individual checks and deposit tickets. This plate then is mounted on a plate cylinder of an offset printing press. When the press is operated, the information on the plate is inked and that image is transferred to a blanket mounted on an intermediate or blanket cylinder, in a mariner known to those skilled in the art. The inked images applied to the blanket are in turn transferred to sheets of paper stock fed between the blanket cylinder and a third cylinder, known as the impression cylinder. (An actual check-printing plate is several times larger than an individual check and contains images to print deposit tickets and checks for a number of different accounts during a single press run. These different checks and deposit tickets are printed on paper stock of the same overall size as the printing plate, and the printed paper stock is cut after printing to separate the checks and deposit tickets for each individual account.)

The conventional mariner of printing different account-line information on the checks and deposit tickets for a particular account requires preparing two separate plates. One plate contains the account line and other information unique to the deposit tickets for a particular account, and the other plate contains the account-line information and other matter unique to the checks themselves. In most cases, the information on those two plates was identical except for the different account-line information required for the checks and deposit tickets. Once the two plates are prepared, one plate is mounted on the plate cylinder of the offset press and the press is operated while a supply of deposit ticket paper stock is fed through the press. The press operator then stops the press, removes the first plate and substitutes the second plate, and then restarts the press after loading a supply of check stock. This procedure requires the added expense of preparing two separate plates for printing a single order of checks and deposit tickets for an account Moreover, the printing process itself is slowed by the need to swap the plates during the press run for a particular order.

It has been proposed to eliminate the need for two plates by providing a single plate with the two account-number lines positioned one above the other on the plate. That printing plate is combined in the press with a blanket having a raised portion to contact only one of the two account-number lines, depending on the angular alignment of the blanket cylinder relative to the plate cylinder. This arrangement does away with the requirement for two separate plates, but still requires stopping the press to manually index the plate cylinder to align the desired account line with the raised portion on the blanket.

SUMMARY OF THE INVENTION

Stated in general terms, different account lines or other indicia are printed on documents during a single press run by providing a printing plate containing the different account lines on at least two locations separated by a certain distance on the plate. The plate is combined on a press with a blanket cylinder having a region that does not receive an impression from a predetermined region of the plate, that region corresponding to one of the account lines on the plate. Before commencing a printing run, the plate cylinder and blanket cylinder of the press are mutually aligned so that the noncontacting region of the blanket is registered with the plate location containing one of the account lines during each revolution of those two cylinders. As a result, the blazer does not receive an inked impression of the account line at that location, although an inked image of the other account line (and of the other information on the plate) is transferred to the blanket cylinder for each rotation of the press. Those inked impressions are transferred from the blanket cylinder to sheets of paper supplied to the press. The press thus initially prints documents containing only a first account line, namely, the account line that is not in registry with the noncontacting region of the blanket while a second account line on the plate registers with the noncontacting region and is not printed.

After a certain number of sheets, which may be deposit tickets, are printed bearing the first account line, the angular position of the plate cylinder relative to the blanket cylinder is shifted on the fly to displace the noncontacting region to the first account line instead of the second account line on the plate. This shifting of relative angular alignment between the plate and blanket cylinders takes place on the fly, without stopping the operation of the press, and displaces the position of the printing plate in relation to the blanket by a predetermined amount that causes the noncontacting region of the blanket to register with the second account line on the plate during each rotation of the cylinders. As a result, the blanket commences receiving an inked impression of the second account line but no longer receives an inked impression of the first account line. Consequently, the sheets (for example, check stock) passing through the press after the on-the-fly shifting of the plate cylinder are imprinted with the second account number instead of the first account number imprinted on the deposit tickets during the earlier part of the press run.

Stated somewhat more particularly, at least one of the plate cylinder and the blanket cylinder are driven through a mechanism that accomplishes automatic displacement of the relative angular position between those two cylinders without stopping the press. In a preferred embodiment of the invention, this mechanism includes a differential drive which is connected to one of those two cylinders and receives two inputs. One of those inputs is coupled to a conventional drive mechanism rotating the press cylinders for printing. The other such input is selectively operated when it is desired to change the angular position of the plate cylinder relative to the blanket cylinder. The output of the differential drive is coupled to the plate cylinder or the blanket cylinder, and represents the sum or difference between the two inputs. Operating the second input by a predetermined extent thus advances or retards the angular position of the plate cylinder relative to the blanket cylinder in the certain extent required for repositioning the noncontacting region of the blanket from one account line to another account line.

Stated with greater particularity, the second input to the differential drive also is a rotary input and is connected to a secondary drive mechanism capable of rotating in precise predetermined increments. That secondary drive mechanism includes a stepper motor, in the preferred embodiment of the invention. This stepper motor is operated in response to a trigger signal generated by detecting a trigger sheet that separates the initial live printing pages (for example, deposit tickets) that are to receive the first account number, from the subsequent live sheets (for example, checks) that are to receive the second account number. Those two sets of sheets, separated by the trigger sheet and possibly containing additional sheets for other purposes known in the art, are precollated before the press run and are serially fed to the press during a continuous run. As the trigger sheet is detected entering the press, the stepper motor is driven to rotate the second input of the differential drive to an extent that the plate cylinder is repositioned to move the second account line into registry with the noncontacting region on the blanket as the press cylinders continue to rotate. In that manner, the respective different account-number lines are printed on the first and second sets of documents in the precollated stack without need to change printing plates or otherwise interference with the press as the entire precollated stack of documents is fed therethrough.

Accordingly, it is an object of the present invention to provide an improved apparatus and method for printing.

It is another object of the present invention to provide an improved method and apparatus for printing checks or other documents containing indicia such as account numbers or the like.

It is a further object of the present invention to provide a method and apparatus for printing different account numbers on related documents without requiring separate printing plates and without interrupting the press.

It is yet another object of the present invention to provide a printing method and apparatus that permits accurate and predetermined adjustment of the relative position of the printing cylinder on the fly, without interrupting operation of the press.

The foregoing and other objects and advantages of the present invention will become more readily apparent from the following discussion of a preferred embodiment.

DETAILED DESCRIPTION OF PREFERRED EMBODIMENT

Figure 1:
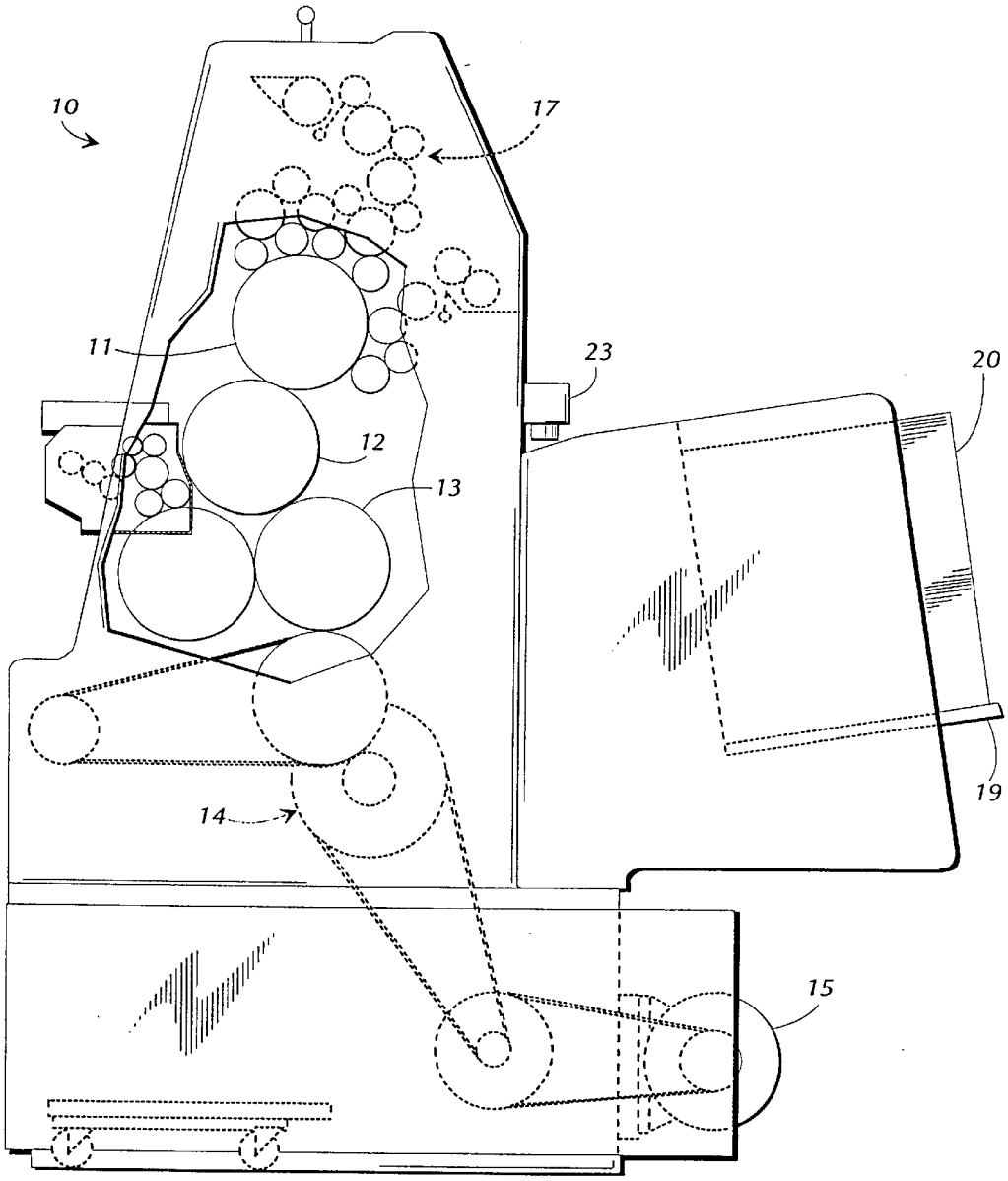
FIG. 1 is a side elevation view, shown partially cutaway for illustration, of an offset press according to a preferred embodiment of the present invention.

Turning first to FIG. 1, there is shown generally at 10 an offset printing press having a plate cylinder 11, a blanket cylinder 12, and an impression cylinder 13. The three cylinders are mounted in juxtaposition in a manner known to those skilled in the art, so that a plate mounted on the plate cylinder makes peripheral contact with a blanket mounted on the blanket cylinder, which in turn makes peripheral contact with the impression cylinder. The three cylinders are connected to a motor 15 by a drive mechanism shown generally at 14 for rotating the cylinders in exact synchronism with each other, during normal operation of the press. The drive mechanism 14 of a typical offset press includes meshed gears 16a, 16b, and 16c (FIG. 2) corrected to the drive shafts of each cylinder to ensure that the cylinders remain in mutual registry during printing although, as will be seen, the gear 16c of the press 10 is not directly connected to the shaft of the plate cylinder 11. The press 10 also includes a series of inking cylinderers 17 for applying ink to a plate on the plate cylinder 11; further details of offset presses in general are known in the art and need not be described herein.

The press 10 is a sheet-fed press having an infeed tray 19 in which precollated sheets of paper 20 are stacked to be serially fed through the press. Sheets from the stack 20 are led between the blanket cylinder 12 and the impression cylinder 13 so that the inked impression on the blanket cylinder is transferred onto the sheets. The press 10 includes an optical sensor 23 positioned at the top of the tray 19 to sense the occurrence of a predetermined trigger on one or more of the sheets in the stack 20 as those sheets are fed into the press. These triggers are optically sensible in the preferred embodiment and are described below in more detail. Accordingly, the optical sensor 23 is a device appropriate for sensing the visual triggers, and may be a photocell or fiber-optic device suitably positioned to sense the occurrence of a trigger and operative to produce an electrical signal in response to that trigger.

Figure 2:
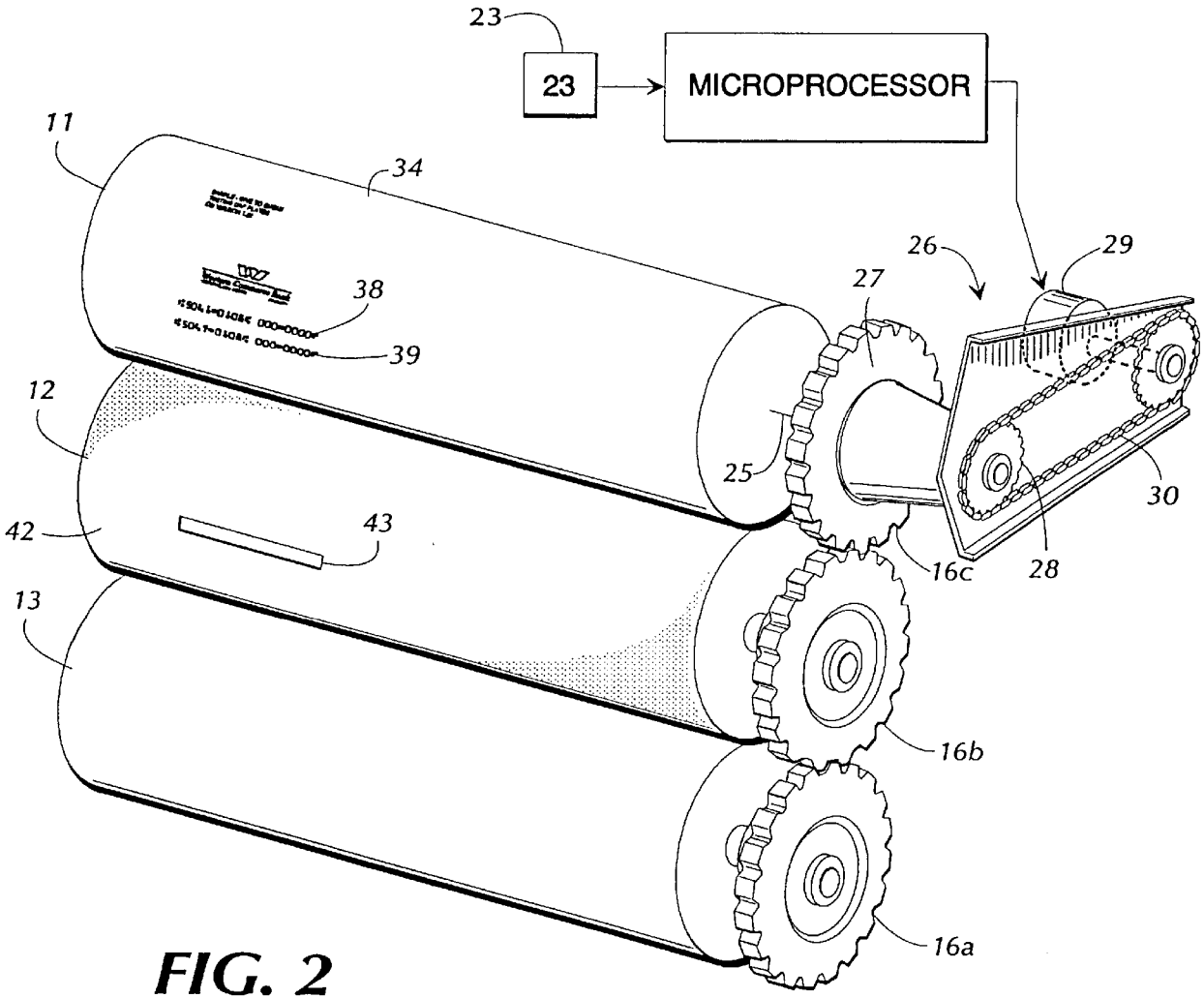
FIG. 2 is an isometric schematic view showing the press cylinders and associated drive mechanism according to the preferred embodiment, and also showing a typical plate cylinder and blanket mounted on their respective cylinders.

Further details of the three cylinders and associate drive mechanisms or the preferred embodiment are seen in FIG. 2.

The plate cylinder 11 rotates on a shaft 25 connected to a differential drive 26. In a preferred embodiment, this differential drive is a harmonic drive assembly available from Candy Manufacturing Company of Evanston, Ill. The differential drive 26 has an output directly coupled to the shaft 25 of the plate cylinder 11. The differential drive also has a pair of inputs, the first input 27 having the drive gear 16c meshed with the gear 16b and thus connected to the aforementioned gear train for driving the press cylinders by the drive mechanism 14. The second input 28 of the differential drive 26 is connected to a stepper motor 29 by the chain drive 30 extending between the stepper motor and the second input to the differential drive. As will become apparent, the stepper motor 29 rotates only when it is desired to displace the angular position of the plate cylinder 11 relative to the blanket cylinder 12. Electrical pulses to operate the stepper motor 29 are supplied from a microprocessor 31 in response to an input signal from the optical sensor 23.

Figure 3:
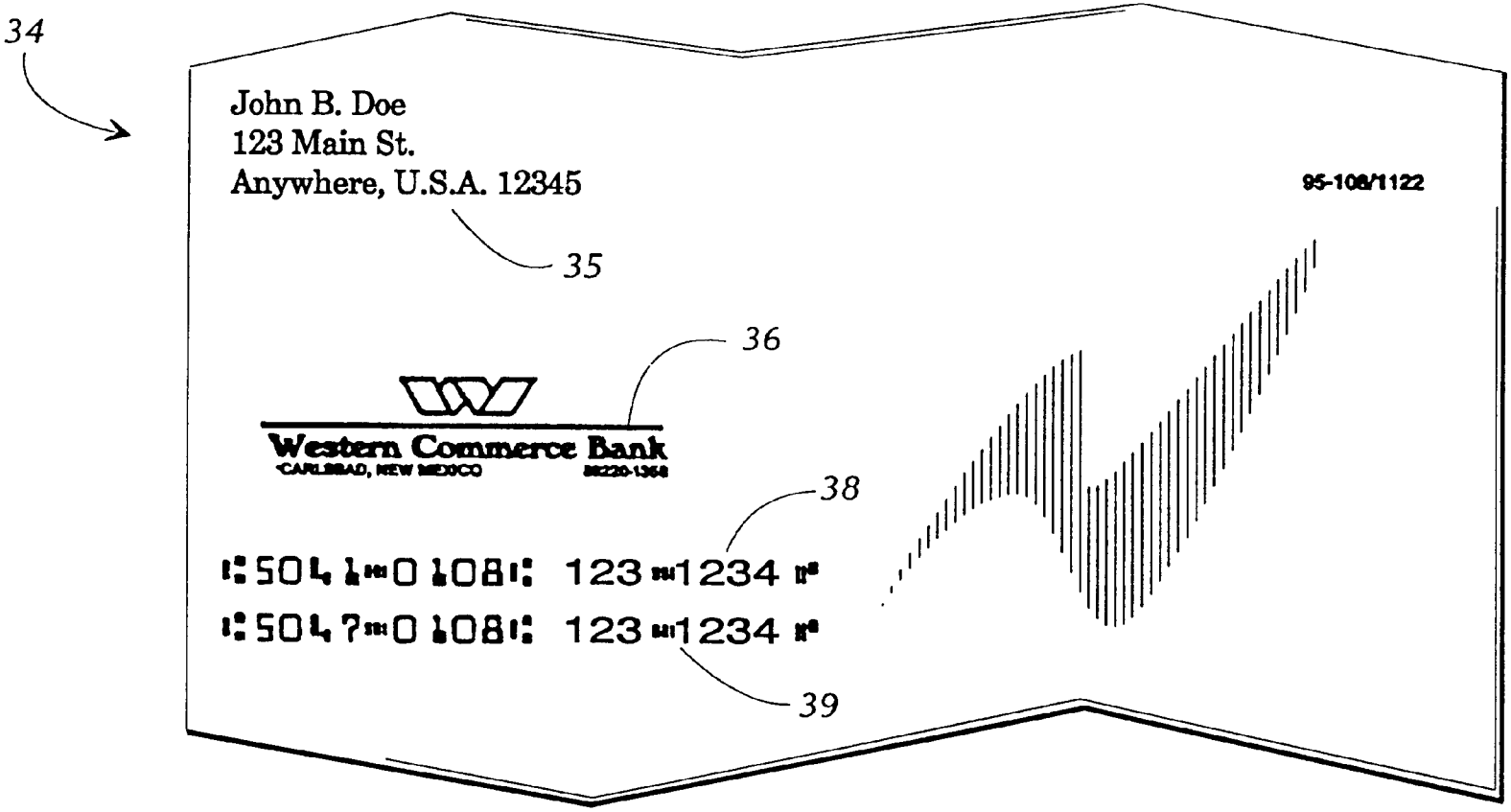
FIG. 3 is an enlarged partial view of the plate cylinder, laid flat for illustration, shown in FIG. 2.
Figure 4:
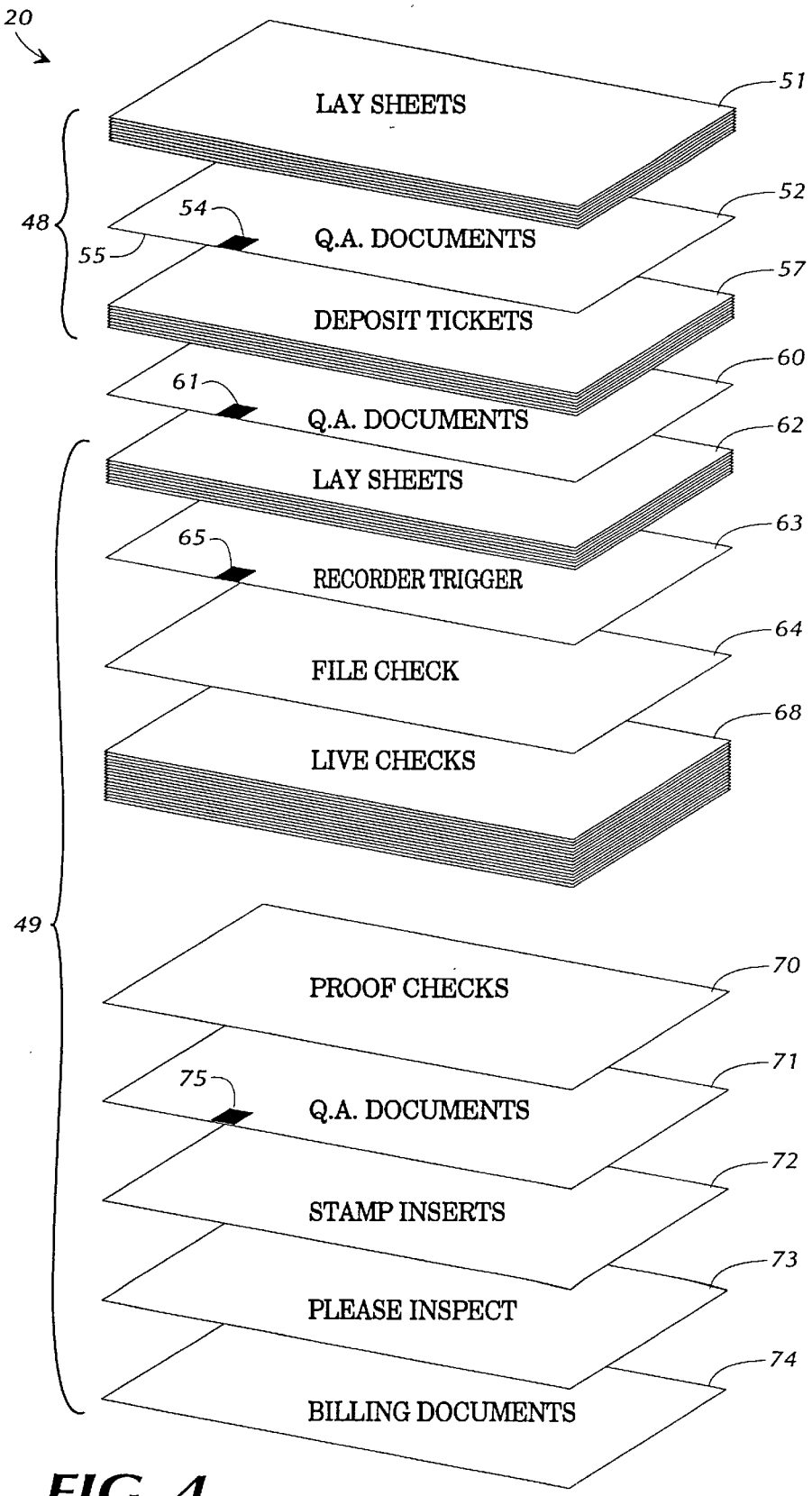
FIG. 4 is an exploded view showing a precollated stack of documents for printing according to the present invention.

FIG. 3 shows a fragmentary portion of a printing plate 34 supported on the plate cylinder 11. The depicted portion of the plate 34 includes indicia for printing checks and deposit tickets in connection with separate accounts. The plate 34 contains the name and address 35 of a particular accountholder at the upper-left portion of the plate 34, and also contains the name and address 36 of the particular bank or other financial institution maintaining that account. Those skilled in the art will understand that lines for dates, amounts drawn or deposited, the payee's name, and the payor's signature, are common to all deposit tickets and checks, and that information will be preprinted on paper stock supplied to the press 10 to imprint the information unique to a particular account. Thus, the printing plate 34 contains only that unique information, leaving blank the remaining areas corresponding to the common information preprinted on the paper stock for the deposit tickets or checks.

The printing plate 34 also contains two separate account-number lines 38 and 39. Those account-lines are located near the lower-left side of the plate 34, and the first such line is vertically separated from the second such line on the plate by a predetermined distance, such as ¼ inch. In the disclosed example of FIG. 3, the account number appearing in the first account-number line 38 is a subset of the number shown in the second account-number line 39, located below the first such line. In the illustrated example, it is assumed the first account-number line contains only the account number of a particular depositor and the second account-number line 39 contains other identifying indicia in addition to that depositor's account number.

FIG. 2 shows a printing blanket 42 modified in accordance with the present invention and supported on the blanket cylinder 12 of the press 10. The blanket 42 has a cutout region 43 near its lower-left side, but otherwise may be identical in size and construction to blankets typically used in offset printing. The length and height of the cutout region 43 in the blanket 42 are sufficient to encompass the longer of the two account-number lines 38 and 39, that longer line being 39 in the disclosed embodiment. It is important that the cutout region 43 be at least coextensive with the longer account-number line. One technique for achieving this accurate match is to place the plate 34 and an uncut blanket 42 on their respective cylinders in the press 10, and then operate the press so that the plate cylinder transfers to the blanket an inked impression of the indicia, including the account-number lines on the cylinder. The blanket 42 next is removed from the blanket cylinder, and at least a surface layer of the blanket is removed by cutting around the longer account-number line. When the blanket 42 is reinstalled on the blanket cylinder in the same position as before, that cutout region 43 will be in registry with the longer account-number line 39 on the plate 34 each time the cylinders 11 and 12 are rotated. As a result, an inked impression of the indicia on the second account-number line 39 will not be transferred to the blanket 42 because that account line is juxtaposed with the cutout region 43 in the blanket during each rotation of the plate cylinder and blanket cylinder.

After the printing plate 34 and blanket 42 are prepared for a particular account, the plate and blanket are mounted on the plate cylinder 11 and blanket cylinder 12 of the press 10 so that the cutout region 43 on the blanket registers with one of the account-line numbers 38 or 39 during each rotation of the press cylinders. The infeed tray 19 of the press is supplied with a precollated paper stack 20, with FIG. 5 depicting a typical precollated paper stack according to the present invention. These sheets feed into the press 10 from the top of the stack 20, which includes a deposit ticket cycle 48 and a check cycle 49.

The deposit ticket cycle 48 starts with several lay sheets 51 that are run through the press 10 as the blanket 42 is being inked up by the plate 34; the lay sheets are subsequently discarded. Following the lay sheets 51 is the first quality assurance (Q.A.) document 52, which contains a trigger 54 at a predetermined location on its upper face. The trigger 54 in the disclosed embodiment is a black bar contiguous to the forward or leading edge 55 of the Q.A. document 52, and positioned on that document to be detected by the optical sensor 23 at the press as the Q.A. document is fed into the press from the top of the stack 20. The Q.A. document 52 is followed in the deposit ticket cycle 48 by a quantity of deposit tickets 57 preprinted with indicia generic to deposit tickets irrespective of a particular account.

The sheets making up the deposit ticket cycle 48 are separated from the sheets of the check cycle 49 by a second Q.A. document 60, also called the account-line trigger document. That document 60 contains a trigger 61 identical in size and placement to the trigger 54 on the first Q.A. document 52. The trigger 61 will be detected by the optical sensor 23 as the account-line trigger document 60 moves to the top of the stack 20 and is being fed into the press 10.

Following the account-line trigger document 60, the initial sheets of the check cycle 49 are another batch of lay sheets 62, followed by a reorder trigger sheet 63 and a file check sheet 64. The reorder trigger document 63 contains a trigger 65 similar in nature and location to the other triggers. The reorder trigger sheet 63 contains preprinted information advising the account holder of the need to reorder checks when the presently-printed batch runs low, and will be printed with the depositor's name and address and account number during the present printing operation. The file check sheet 64 will be retained by the check printer in a file associated with the particular account.

Following the file check sheet 64 in the check cycle 49 are a quantity of live checks 68. These live checks will be sent to the depositor, after being printed with the name, address, and account number as herein and bound with the printed deposit tickets 57.

Following the live checks 68 in the check cycle 49 are a proof check sheet 70, another Q.A. document 71, a stamp insert sheet 72, a sheet 73 advising the depositor to "Please inspect" the printed checks, and one or more sheets 74 comprising bill documents containing accounting information for billing the check-printing service to the appropriate account. The Q.A. document 71 contains a trigger 75 similar to the previous triggers. The propose of the proof check, stamp insert, please inspect, and billing documents are known to those skilled in the art.

With the printing plate 34 and the blanket 42 placed on the corresponding cylinders and the document stack 20 loaded in the press, the operation of the press can be started. The stepper motor 29 is not operated at this time, and only the first input 27 of the differential drive 26 is driven as the gear 16c is driven by the gear 16b and other components of the drive mechanism 14. The output of the differential drive thus rotates the shaft 25 of the plate cylinder at a 1:1 ratio with the gear 16c.

The first group of lay sheets 51 is initially fed through the press while the plate 34 and blanket 42 are being inked up to transfer a quality impression to the sheets. After the last of the lay sheets 51 passes through the press, the first Q.A. document 52 enters the press after its trigger 54 is detected by the optical sensor 23. That sensor sends a signal to the microprocessor 31, which advances to the next sequence of a preprogrammed set of operating steps. For example, in response to the first trigger signal produced by the trigger 54 on the Q.A. document 52, the microprocessor 31 can control the engagement of a numbering impression mechanism (not shown) associated with the press to serially number the live checks or deposit tickets according to customer order.

Following the Q.A. document 52 through the press, the deposit tickets 57 enter the press and receive inked impressions of the information on the plate 34. This information printed on each deposit ticket includes the first account-line number 38, which presently is misregistered with the cutout region 43 on the blanket 42 as the plate cylinder and blanket cylinder rotate. However, the second account-line number 39 is in registry with the cutout region 43 on the blanket, and so an inked impression of that second account-line number is not received by the blanket nor transferred from the blanket to the deposit tickets 57 passing through the press.

After the last deposit ticket 57 is fed through the press, the account-line trigger document 60 is fed from the top of the stack 20 and the optical sensor 23 detects the trigger 61 on that document. The sequence of occurrence of this trigger 61 (the second such trigger, in the present embodiment) sequences the operating routine of the microprocessor 31 to a routine that selectively shifts the relative positions of the plate 34 and the blanket 42 so that the second account-line number 39, previously in registry with the cutout region 43 on the blanket, moves out of registry with that cutout region and the first account-line number 38 moves into such registry. Because the two account-line numbers 38 and 39 are separated by ¼ inch on the vertical dimension of the plate 34, in the example of the disclosed embodiment, the periphery of the plate cylinder 11 must advance (or retard, depending on placement of the plate 34 on the plate cylinder) by that same distance relative to the periphery of the blanket 42 on the blanket cylinder. This offset or displacement of the plate cylinder 11 relative to the blanket cylinder 12 is accomplished on the fly by operating the stepper motor 29 under control of the microprocessor 31, while the press 10 continues to run.

The stepper motor 29 drives the second input 28 of the differential drive 26 in a direction and by an amount that causes the aforementioned ¼ inch displacement of the plate 34 mounted on the plate cylinder 11. The rotation of the stepper motor 29 required for that purpose depends on several variables, including the radius of the plate cylinder, the drive ratio of the first and second inputs to the output of the differential drive 26, the ratio of the gears at the input and output ends of the chain drive 30, and the resolution of the stepper motor itself. Those variables should be chosen so that a certain sequence of operating pulses received by the stepper motor produces the desired displacement of the printing plate relative to the blanket, and the microprocessor 31 is programmed to deliver that sequence of operating pulses to the stepper motor.

The account-line trigger document 60 is followed through the press 10 by the second batch of lay sheets 62. The aforementioned displacement of the plate cylinder relative to the blanket cylinder occurs relatively rapidly, e.g., while at most the trigger document 60 and the first of the lay sheets 62 are fed through the press, so that any smearing or misregistry of the inked images transferred to the printed sheets occurs on the trigger document or the lay sheets, all of which will be discarded. The lay sheets 62 clean up the remaining inked impressions previously imparted to the blanket 42 by the original position of the plate 24, while the blanket is being inked up with images transferred by the repositioned plate. Those images include an image of the second account-line number 39, which no longer registers with the cutout region 43 on the blanket, but not an image of the first account-line number 38 which now registers with that cutout region.

Once the last lay sheet 62 passes through the press, the optical sensor 23 detects the trigger 65 on the reorder sheet 63. As previously mentioned, this trigger detection can cause the microprocessor 31 to initiate another aspect of the printing operation, such as actuating the numbering apparatus to commence printing the sequential check numbers on the following documents. The first such following document is the file check sheet 64, which in turn is followed by the live checks 68. Both the file check sheet 64 and the live checks 68 thus receive the second account line number 39 instead of the first account-line number 38 previously imprinted on the deposit tickets, because the plate cylinder 11 was previously displaced relative to the blanket 42.

After the last of the live checks 68 passes through the press, the printing operation is concluded as the remaining documents 70–74 serially enter the press. The trigger 75 on the Q.A. document 71 is detected by the optical sensor to step the microprocessor 31 to the next predetermined sequence which, for example, may disable the previously-enabled sequential numbering of the live checks and the proof check. Once the press run is completed, the press is stopped and the printing plate is removed and the stepper motor may be rotated in the opposite direction to restore the original relative position of the plate and blanket cylinders. A new printing plate obviously is required for a subsequent operation involving checks for one or more different depositors, but the same blanket 42 may be used because the first and second account-line numbers should occupy the same positions on the new plate as on the first plate, so that a first such number registers with the cutout region 43 of the blanket until the plate cylinder is again shifted to register the other such number with the cutout region.

Although the preferred embodiment discloses the differential drive 26 as connected to the plate cylinder 11, which shifts on the fly to reposition the plate relative to the blanket, it should be apparent that the desired relative displacement of plate and blanket can also be obtained by angularly displacing the blanket cylinder relative to the plate cylinder. In that alternative, the differential drive 26 would instead be connected to drive the blanket cylinder instead of the plate cylinder as disclosed herein.

It will now be seen that the present invention allows printing different indicia on two different sets of documents during a single press run, without requiring separate printing plates and without interrupting the press run to change plates or to manually displace the press cylinders. This on-the-fly changing of account lines significantly simplifies printing documents such as checks and deposit tickets where different account numbers or other indicia are to be printed on different sheets of a document set. The ability to change the press on the fly to print the appropriate account line, together with changing the press on the fly to select the appropriate line at predetermined places in a precollation of sheets, are important aspects of the present invention.

Although the disclosed embodiment selects one of only two different account lines for printing on documents, it should now be apparent that the present invention is not so limited. Another application of this invention is used to print so-called starter checks and deposit slips for new bank accounts. These starter kits typically have ten or so checks and a corresponding smaller number of deposit tickets, and are given to a depositor immediately upon opening a new account. Previously, a plate containing the appropriate MICR number for a new account was mounted on the press, ten checks plus deposit tickets were printed, and the press was stopped to remove the plate and install a new plate with the next MICR number for the next new-account starter set, and so on.

Using the new process, a plate is prepared having, for example, ten new-account MICR numbers spaced apart on ten lines in a vertical array. A blanket is prepared having, a raised portion that contacts only a selected account line. (The name and address of the future new depositor is not known and not required for starter checks.) A precollated stack of deposit tickets and checks then is inserted into the press, with account-line trigger documents separating each individual set of checks and deposit tickets. The plate cylinder is automatically displaced to select a new account line after each ten checks and associated deposit tickets are printed. In this way, ten starter sets of checks and deposit tickets for new accounts can be printed with a single plate, and without stopping the press to change plates.

It should be apparent that the foregoing relates only to a preferred embodiment of the present invention, and that numerous changes and modifications therein may be made without departing from the spirit and scope of the invention as defined in the following claims.

What is claimed is:

1. A printing press for applying impressions to media, comprising:

a first member movable on a predetermined path and operative to support a printing plate containing indicia on at least two locations separated by a certain distance relative to the path of movement;

at least one other member movable in predetermined relation to the first member and positioned to receive a transferable impression of the indicia on a plate supported by the first member, whereby the transferable impression can be transferred from the other member to a medium; and drive means operatively associated with at least one of the members to selectively displace the predetermined relation between the members by said certain distance while the members are moving in the predetermined relation, so as to produce a corresponding displacement in the position of the impressions thereafter transferred to the media.

2. Apparatus as in claim 1, wherein:

the first member is a first cylinder rotatable on an axis;

the other member is a second cylinder rotatable on an axis in predetermined relation to the first cylinder; and the drive means is operative to angularly shift one of the cylinders on its axis with respect to the axial position of the other cylinder while the cylinders are rotating, so as to produce said displacement.

3. Apparatus as in claim 2, wherein:

the drive means comprises a differential drive having a first input and a second input and an output driving the one cylinder in response to the first and second inputs;

one such input is connected to rotate the one cylinder in the predetermined relation with the other cylinder; and the other such input is connected for selective rotation operative to produce the predetermined displacement in the output driving the one cylinder.

4. Apparatus as in claim 3, wherein:

the one input of the differential drive and the cylinder not driven by the differential drive are operatively interconnected to a primary drive source so as to rotate with the predetermined relation to each other; and further comprising a secondary drive source connected to the other input of the differential drive, so that the cylinders rotate with the predetermined relation when the secondary drive source is stationary and undergo the angular shift in the predetermined relation in response to selective rotation of the secondary drive source.

5. A rotary printing press, comprising:

a first rotatable cylinder for supporting a printing plate containing first and second indicia respectively on two locations separated by predetermined angular displacement of the cylinder;

a second cylinder adjacent to the first cylinder and rotatable in predetermined relation to the first cylinder for supporting a transfer member in juxtaposition with the printing plate to receive an impression of the indicia on the printing plate;

the transfer member having a noncontacting region corresponding to one of the indicia on the plate, so that the transfer member does not receive an impression of any indicia that is in registry with the noncontacting region as the first and second cylinders are rotated;

a third rotatable cylinder in juxtaposition with the second cylinder and operatively associated with the second cylinder to move successive units of a medium in contact with the transfer member so that the units receive an impression of the indicia transferred from the printing plate to the transfer member;

primary drive means operatively associated with the cylinders so as to rotate each cylinder at a predetermined speed in relation to the adjacent cylinder; and differential drive means operatively associated with one of the first and second cylinders and selectively operative, while the primary drive means is rotating the cylinders, to offset the angular position of the one cylinder relative to the other by an amount corresponding to the predetermined angular spacing separating the two indicia locations on the printing plate supported by the first cylinder, thereby displacing the printing plate on the fly relative to the transfer member so that the second indicia at one location on the printing plate becomes aligned with the noncontacting region of the transfer medium in place of the first indicia at the other location on the printing plate, so that the indicia transferred to units of the medium moved in contact with the transfer member after the selective offset of the one cylinder is different from the indicia transferred to the sheets of medium before the selective offset.

6. Apparatus as in claim 5, wherein:

the differential drive means comprises a differential drive having a first input and a second input, and having an output driving the one cylinder in response to the first and second inputs;

one of the inputs being operatively associated with the primary drive means so as to rotate the one cylinder at the predetermined speed in relation to the adjacent cylinder; and the other input being connected for selective rotation operative to produce the selective angular offset of the one cylinder relative to the adjacent cylinder.

7. Apparatus as in claim 6, wherein:

the other input of the differential drive is a rotatable input connected to a motive device selectably operable to produce discrete incremental movement, so that the extent of the resulting angular offset of the one cylinder thereby occurs in corresponding discrete increments.

8. Apparatus as in claim 7, wherein the motive device comprises a stepper motor connected to the other input of the differential drive and selectively operative to drive the second input through a certain number of increments required to accomplish the selected angular offset.

9. Apparatus as in claim 5, further comprising:

a sensor located in certain relation to the units of medium moved by the third cylinder and responsive to a predetermined trigger on a certain unit of the medium to operate the differential drive means, so that units of medium following the certain unit receive an impression of the second indicia.

10. Apparatus as in claim 9, wherein the trigger comprises an optically sensible element.

11. A method of printing diverse information on plural units of a medium, comprising the steps of:

providing a printing plate containing indicia on at least two predetermined locations separated by a certain distance;

providing a transfer member for receiving an impression of the indicia on the printing plate when the transfer member is operatively juxtaposed with the printing plate and having a region that does not receive an impression from a predetermined region of the printing plate corresponding to one of the predetermined locations on the printing plate;

repetitively juxtaposing the transfer medium with the printing plate and with successive units of the medium so that the transfer member receives an impression of indicia on the printing plate, except for the indicia at the selected predetermined location, and transfers the impression to the units;

displacing the position of the printing plate in relation to the transfer member during said repeated juxtaposition so as to displace the region on the transfer member from the one predetermined location to another predetermined location, whereby the impressions transferred to the units of medium after said displacement includes the indicia at the other predetermined location but not the indicia at the one predetermined location.

12. The method as in claim 11, comprising the further steps of:

placing a trigger mark on one of the units of medium;

detecting the trigger mark as the units are successively juxtaposed with the transfer member; and performing the step of displacing in response to detecting the trigger, so that the indicia at the other location are transferred to the units of medium following the sheet with the trigger mark.

13. The method as in claim 12, wherein:

the first units comprise deposit tickets onto which the indicia at the other location are to be printed; and the second units comprise checks onto which the indicia at the one location is to be printed.

*14. A printing press for applying impressions to media, comprising:*

*a first member movable on a predetermined path and operative to support a printing plate containing indicia on a predetermined location;*

*at least one other member movable in predetermined relation to the first member and positioned to receive a transferable impression of the indicia on the plate supported by the first member, whereby the transferable impression can be transferred from the other member to a medium; and*

*drive means operatively associated with at least one of the members to selectively displace the predetermined relation between the members by a distance while the members are moving in the predetermined relation,*

*so that the selective operation of the drive means determines whether the transferrable impression received by the other member includes the indicia on the plate at the predetermined location.*

*15. Apparatus as in claim 14, wherein:*

*the other member comprises a noncontacting region that does not receive the transferable impression of the indicia on the plate, when the noncontacting region is in registry with the predetermined location.*

*16. Apparatus as in claim 15, wherein:*

*the selective displacement of the predetermined relation between the members is operative to position the noncontacting region of the other member so that the noncontacting region is in registry with the predetermined location.*

*17. Apparatus as in claim 14, wherein:*

*the first member is a first cylinder rotatable on an axis;*

*the other member is a second cylinder rotatable on an axis in predetermined relation to the first cylinder; and*

*the drive means is operative to angularly shift one of the cylinders on its axis with respect to the axial position of the other cylinder while the cylinders are rotating, so as to produce said displacement.*

*18. Apparatus as in claim 17, wherein:*

*the drive means comprises a differential drive having a first input and a second input and an output driving the one cylinder in response to the first and second inputs;*

*one such input is connected to rotate the one cylinder in the predetermined relation with the other cylinder; and*

*the other such input is connected for selective rotation operative to produce the predetermined displacement in the output driving the one cylinder.*

*19. Apparatus as in claim 18, wherein:*

*the one input of the differential drive and the cylinder not driven by the differential drive are operatively interconnected to a primary drive source so as to rotate with the predetermined relation to each other; and further comprising*

*a secondary drive source connected to the other input of the differential drive, so that the cylinders rotate with the predetermined relation when the secondary drive source is stationary and undergo the angular shift in the predetermined relation in response to selective rotation of the secondary drive source.*

*20. A rotary printing press, comprising:*

*a first rotatable cylinder for supporting a printing plate containing at least one indicia;*

*a second cylinder adjacent to the first cylinder and rotatable in predetermined relation to the first cylinder for supporting a transfer member in juxtaposition with the printing plate to receive an impression of the indicia on the printing plate;*

*the transfer member having a noncontacting region corresponding to one of the indicia on the plate, so that the transfer member does not receive an impression of the indicia that is in registry with the noncontacting region as the first and second cylinders are rotated;*

*a third rotatable cylinder in juxtaposition with the second cylinder and operatively associated with the second cylinder to move successive units of a medium in contact with the transfer member so that the units receive an impression of the indicia transferred from the printing plate to the transfer member;*

*primary drive means operatively associated with the cylinders so as to rotate each cylinder at a predetermined speed in relation to the adjacent cylinder; and*

*differential drive means operatively associated with one of the first and second cylinders and selectively operative, while the primary drive means is rotating the cylinders, to offset the angular position of the one cylinder relative to the other, thereby displacing the printing plate on the fly relative to the transfer member so that one of the indicia on the printing plate becomes aligned with the noncontacting region of the transfer medium,*

*so that the indicia transferred to units of the medium moved in contact with the transfer member after the selective offset of the one cylinder is different from the indicia transferred to the sheets of medium before the selective offset.*

*21. Apparatus as in claim 20, wherein:*

*the differential drive means comprises a differential drive having a first input and a second input, and having an output driving the one cylinder in response to the first and second inputs;*

*one of the inputs being operatively associated with the primary drive means so as to rotate the one cylinder at the predetermined speed in relation to the adjacent cylinder; and*

*the other input being connected for selective rotation operative to produce the selective offset of the one cylinder relative to the adjacent cylinder.*

*22. Apparatus as in claim 21, wherein:*

*the other input of the differential drive is a rotatable input connected to a motive device selectably operable to produce discrete incremental movement, so that the extent of the resulting angular offset of the one cylinder thereby occurs in corresponding discrete increments.*

*23. Apparatus as in claim 22, wherein the motive device comprises a stepper motor connected to the other input of the differential drive and selectively operative to drive the second input through a certain number of increments required to accomplish the selected angular offset.*

*24. Apparatus as in claim 20, further comprising:*

*a sensor located in certain relation to the units of medium moved by the third cylinder and responsive to a predetermined trigger on a certain unit of the medium to operate the differential drive means, so that units of medium following the certain unit receive an impression of the second indicia.*

*25. Apparatus as in claim 24, wherein the trigger comprises an optically sensible element.*

*26. A method of printing diverse information on plural units of a medium, comprising the steps of:*

*providing a printing plate containing indicia on a predetermined location;*

*providing a transfer member for receiving an impression of the indicia on the printing plate when the transfer member is operatively juxtaposed with the printing plate and having a region that does not receive an impression from a predetermined region of the printing plate corresponding to the predetermined location on the printing plate;*

*repetitively juxtaposing the transfer member with the printing plate and with successive units of the medium so that the transfer member receives an impression of indicia on the printing plate, except for the indicia at the predetermined location, and transfers the impression to the units; and*

*displacing the position of the printing plate in relation to the transfer member during said repeated juxtaposition so as to displace the region on the transfer member between the predetermined location and another location on the printing plate, whereby the impressions transferred to the units of medium at the displaced position of the printing plate include the indicia at the predetermined location.*

*27. The method as in claim 26, comprising the further steps of:*

*placing a trigger mark on one of the units of medium;*

*detecting the trigger mark as the units are successively juxtaposed with the transfer member; and*

*performing the step of displacing in response to detecting the trigger.*

*28. A method of printing diverse information on plural units of a medium, comprising the steps of:*

*providing a printing plate containing indicia on a predetermined location;*

*providing a transfer member for receiving an impression of the indicia on the printing plate when the transfer member is operatively juxtaposed with the printing plate and having a region that does not receive an impression from a predetermined region of the printing plate corresponding to the predetermined location on the printing plate;*

*repetitively juxtaposing the transfer member with the printing plate and with successive units of the medium either at a first predetermined position of the printing plate relative to the transfer member whereat the transfer member receives an impression of indicia on the printing plate, except for the indicia at the selected predetermined location, and transfers the impression to the units or at a second predetermined position of the printing plate relative to the transfer member, whereat the impression received by the transfer member and transferred to the units of the medium include the indicia at the predetermined location; and*

*displacing the position of the printing plate in relation to the transfer member during said repeated juxtaposition*

*so as to displace the region on the transfer member from one said predetermined position to the other said predetermined position, whereby the impressions transferred to less than all the units of the medium after said displacement include the indicia at the predetermined location on the printing plate.*

* * * * *